_United States Patent_ [19]

Davis et al.

[11] 4,073,041
[45] Feb. 14, 1978

[54] CRAB BUTCHERING MACHINE

[75] Inventors: Walter L. Davis; Henry V. Svehaug, both of Milton-Freewater, Oreg.

[73] Assignee: Applied Magnetics, Inc., Goleta, Calif.

[21] Appl. No.: 719,075

[22] Filed: Aug. 30, 1976

[51] Int. Cl.[2] .................. A22C 29/04; A22C 25/08
[52] U.S. Cl. .................................. 17/71; 17/24; 17/52; 17/57; 198/341
[58] Field of Search .............. 17/54, 57, 56, 71, 17/24, 52, 56, 72; 198/339, 341, 343, 577, 858

[56] References Cited

U.S. PATENT DOCUMENTS

| | | | |
|---|---|---|---|
| 2,502,091 | 3/1950 | Harris et al. | 17/71 |
| 2,784,447 | 3/1957 | Thompson et al. | 17/71 |
| 2,857,621 | 10/1958 | Schlichting | 17/52 |
| 3,076,997 | 2/1963 | Evich | 17/54 |
| 3,160,267 | 12/1964 | Howell, Jr. | 198/343 |
| 3,302,236 | 2/1967 | Harris | 17/71 |
| 3,309,730 | 3/1967 | Michael | 17/54 |
| 3,495,293 | 2/1970 | Tolley | 17/71 |
| 3,543,609 | 12/1970 | Borodin | 198/339 X |
| 3,596,310 | 8/1971 | Tolley | 17/71 |
| 3,611,478 | 10/1971 | Lockerby | 17/71 |
| 3,943,600 | 3/1976 | Cramer | 17/52 |

_Primary Examiner_—Russell R. Kinsey
_Assistant Examiner_—Paul J. Hirsch
_Attorney, Agent, or Firm_—Wells, St. John & Roberts

[57] ABSTRACT

An apparatus is described for automatically butchering crabs. The machine includes a conveyor for transporting successive crabs in an inverted condition past a series of spaced work stations. At a first work station the carapace is removed as the conveyor moves the crab past a carapace removing means. Side brushes at a second and third station rotate to remove the gills while jets of water are sprayed against the exposed bottom side to remove the viscera. The conveyor moves the crabs continuously along the prescribed path during this operation. Finally, a guillotine apparatus is positioned along the prescribed path at a fourth work station to successively sever the legs from the crab bodies. The eviscerated, legless bodies then drop into a receiving bin. The conveyor is controlled so as to move at a relatively slow rate while the crab carcasses move through each successive work station. The speed is then increased as the crabs move from one station to another.

6 Claims, 8 Drawing Figures

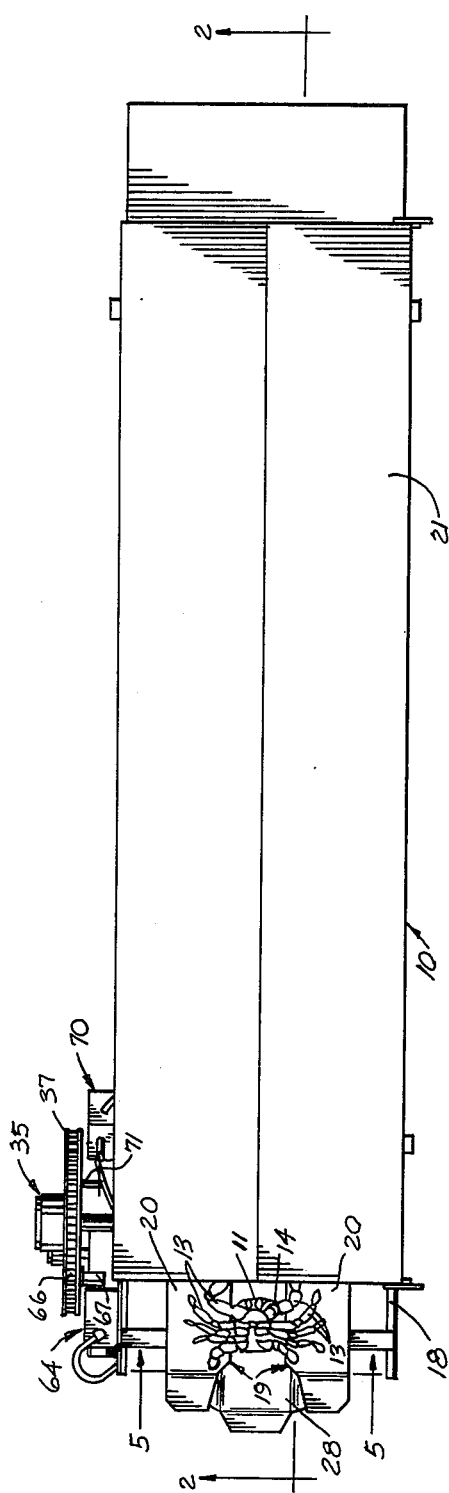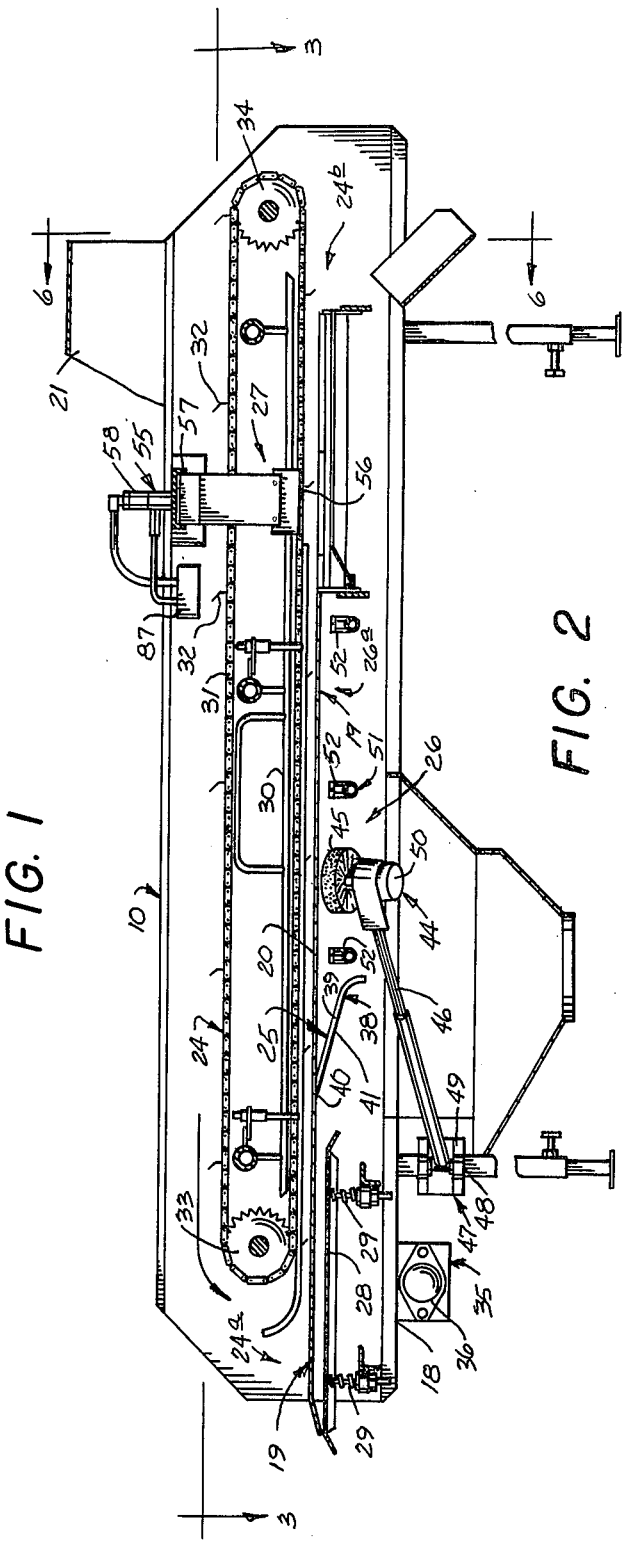

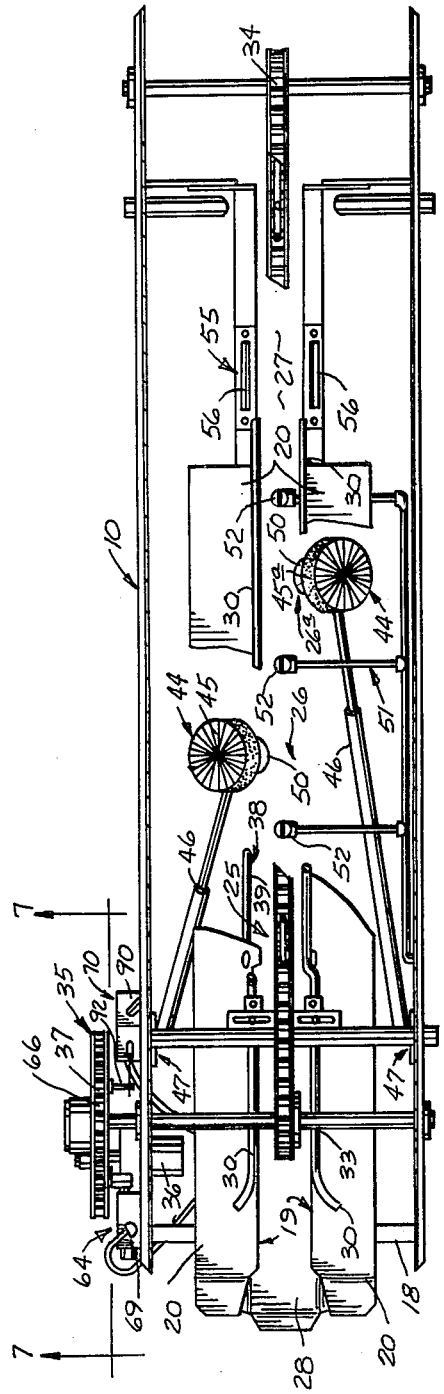
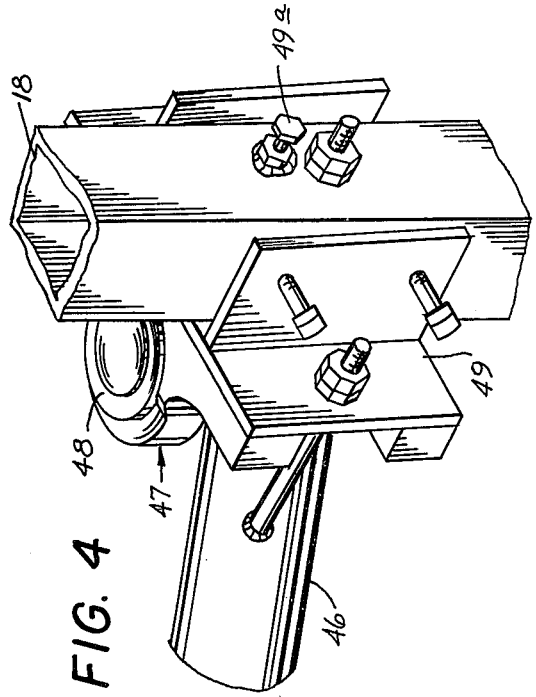
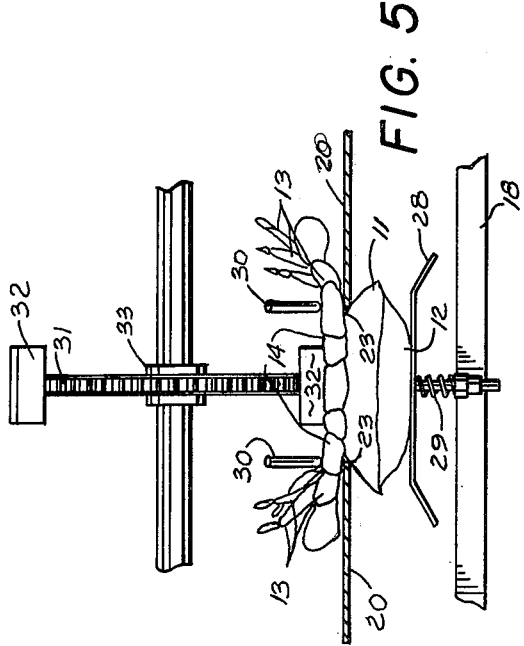

CRAB BUTCHERING MACHINE

BACKGROUND OF THE INVENTION

This invention relates to automatic butchering equipment and more particularly to such equipment for butchering various edible crabs.

Although there has been some effort to automate the butchering process for crabs, most crabs are still presently butchered by hand. The process usually includes the steps of removing the back or carapace from the crab, eviscerating the body cavity, removing the pincers and walking legs, and finally removing the meat from the body and leg cavities. The step of removing the meat from the body cavities is eliminated where the crab sections are to be sold whole.

Various commercial apparatus have been provided to automatically perform the steps of removing the crab meat from the shell. Such machines generally use rollers to press the meat from the body cavities and a salt solution to separate the flesh from the hard shells by flotation. The present invention is concerned primarily with the problem of automatically de-backing, eviscerating, and removing the legs of successive crabs in rapid succession to produce clean crabs for either outright purchase or as a preparation step to the processes performed by such meat-removal machines.

U.S. Pat. No. 3,569,310 to Tolley discloses a crab processing machine. It includes a carriage on an endless chain conveyor. The carriage is adapted to receive crabs of different size and includes integral cutting members for removing the crab carapace. The carcass is cut longitudinally into two sections by a saw on the general framework adjacent the working flight of the conveyor.

Another U.S. Pat. to Tolley, No. 3,495,293, discloses a machine for preparing a hard-shell crab for meat removal. In the Tolley machine, crabs are moved with their carapaces facing upwardly, by conveyor lugs of an endless chain conveyor. A de-backing claw is mounted to a stationary framework for engaging each carapace at a frontal portion thereon and pulling it rearwardly and upwardly from the crab carcass. The loose carapace is then to fall downwardly through the conveyor mechanism. Legs are removed by a rotating wheel having blades thereon and the viscera is brushed away by an overhead rotating brush that is specially contoured to the configuration of the crab body.

U.S. Pat. No. 3,302,263, to S. G. Harris shows a series of independent conveyors that move successive crabs through processing stations. The crabs start the processing on a first conveyor where they are placed in a carapace-down position. Clamps hold the crabs by the carapace and ventral sides of the shells as they move past sets of longitudinal beaters. The beaters operate to rapidly strike the legs and eventually tear the legs free of the carcasses. The crab bodies are then shifted to a second conveyor where they are inverted to carapace-up positions. It is along this conveyor that the carapace is lifted up and off of the crab carcasses by upwardly inclined stationary legs adjacent the working flight of the second conveyor.

U.S. Pat. No. 3,611,478 to W. L. Lockerby shows an apparatus for cutting crab bodies. It includes an endless conveyor similar to the above described apparatus in that it engages the crab carcasses from below and moves them along a prescribed path past a circular saw. It is intended that the carapace be removed prior to operation of the Lockerby device since its only purpose is to section the carcass down the longitudinal or mid-sagital plane.

It is a principal object of this invention to provide a high speed crab butchering machine that is capable of handling in excess of 1000 crabs per hour.

It is an additional object of the present invention to provide a high speed crab butchering machine wherein the carcasses are operated upon in an inverted position (with the carapace facing downwardly) by an overhead conveyor assembly such that the carapaces may fall freely from the crab carcasses and therefore will not interfere with normal operation of the butchering machine.

It is a further object to provide such a machine that includes a drive mechanism that is controlled to speed movement of the successive crabs between work stations and to slow movement of successive crabs as they proceed through the work stations.

A still further object is to provide such a device that includes viscera removing means that will effectively remove viscera from the successive crab carcasses without damaging the adjacent edible flesh.

A still further object is to provide such a machine that may move successive crabs in a continuous non-stop movement of varying speed to further optimize operational speed of the machine while maintaining operational effectiveness.

These and still further objects and advantages will become apparent upon reading the following detailed description which, taken with the accompanying drawings, disclose a preferred form of our invention. It is noted that the following description and attached drawings are given only as a preferred example of the present invention and are not intended in any way to restrict the scope thereof. The scope is set out only in the claims attached at the end of this specification.

BRIEF DESCRIPTION OF THE DRAWINGS

The preferred embodiment of this invention is illustrated in the accompanying drawings, in which:

FIG. 1 is a plan view of the present crab butchering machine incorporating principal features of this invention;

FIG. 2 is a sectional side elevational view of the present machine taken along line 2—2 in FIG. 1;

FIG. 3 is a sectional view taken along line 3—3 in FIG. 2;

FIG. 4 is an enlarged, fragmentary detailed view;

FIG. 5 is an enlarged fragmentary sectioned view taken along line 5—5 in FIG. 1;

DETAILED DESCRIPTION OF A PREFERRED EMBODIMENT

Figure 6:
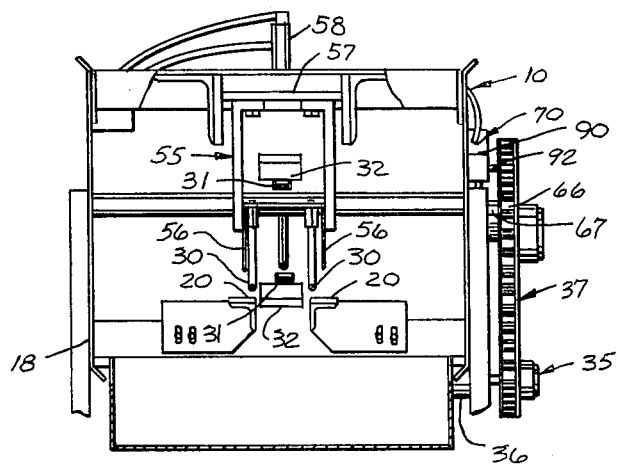
FIG. 6 is an end sectional view taken along line 6—6 in FIG. 2.
Figure 7:
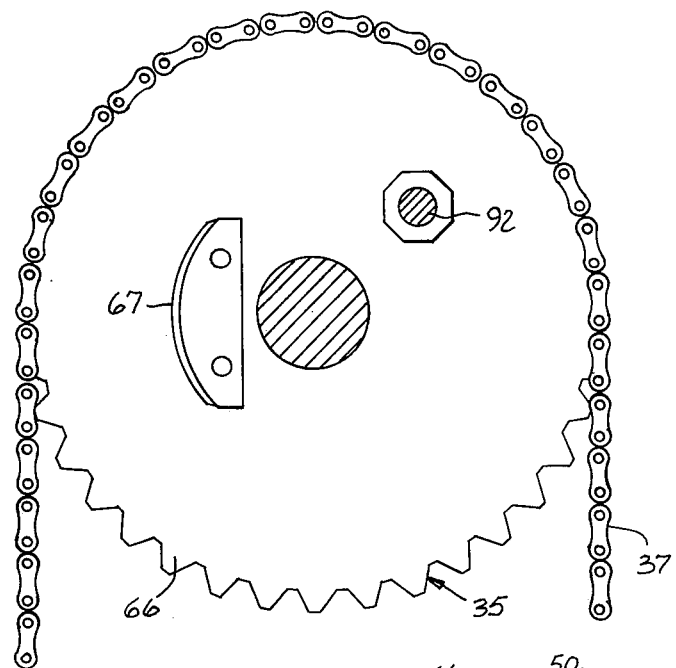
FIG. 7 is an enlarged section taken along line 7—7 in FIG. 3.

Referring now in detail to the drawings, there is shown in FIG. 1 a crab butchering machine that is generally designated by the reference character 10. Machine 10 is utilized to butcher crabs such as that generally illustrated at 11. It is intended that the present machine be utilized to butcher crabs of the commercially edible varieties such as the "Rock," "Jona" and "Blue" crab varieties. Such crabs are ordinarily measured across the back or carapace 12 and an acceptable size ranges from 4½ inches to 8 inches. Legs 13 extend transversely to distances up to 24 inches. The legs are joined at the body at proximal articulations or joints 14. In butchering operations, it is usually desirable to remove the legs from the crab bodies at the articulations 14 and further to remove the carapace 12 from the torso of the body in order to provide access to the viscera and gills enclosed therein.

The present machine 10 is utilized to accomplish the functions for removing the carapace 12, eviscerating the exposed entrails ordinarily covered by the carapace, and severing the legs from the body at the articulations 14. The present invention accomplishes these functions at four work stations along a length of a prescribed, continuous path along which successive crabs are moved continuously.

The machine basically includes an upstanding supported framework 18. A crab support means 19 is provided on frame 18 for supporting successive crabs in an inverted, carapace down condition. Support means 19 includes laterally spaced longitudinal plates 20. The plates 20 engage crab bodies at points 23 (FIG. 5) between the carapace 12 and leg articulations 14. Thus, the plates 20 provide elevational support to the crab bodies as they are moved by a conveying means 24 from a feed station 24a at the front of the machine to a discharge station 24b near the rear of the machine. An elongated hood 21 covers elements of the machine from station 24a to station 24b.

Conveying means 24 moves successive crabs continuously past four successive work stations 25, 26, 26a, and 27 respectively. At the first work station 25, the carapace is removed. This is accomplished as the crabs move along the prescribed path. Downstream of the first work station are the second and third stations 26, 26a at which the gills and viscera are removed. Again, this function is accomplished while the crab moves continuously along the prescribed path. Finally, at the fourth work station, the legs 13 are removed at their proximal articulations 14 and the remaining torso is allowed to fall to a receiving basket or transfer conveyor (not shown).

Crabs are placed by hand at the infeed 24a by pressing the crab carapace 12 against a resilient plate 28, urging it downwardly to an elevation whereat the crab body may be engaged with longitudinal edges of the plates 20 at the points of engagement 23. The plate 28 is movably mounted to the frame 18 through springs 29. Its function is to provide guidance and some elevational support to the successive crab bodies as they are loaded into the machine. Longitudinal guide rods 30 are also provided above plates 20. They function to hold the legs relatively flat against plates 20 as the crabs are moved along.

The successive crabs loaded into the machine are engaged by an overhead conveying means 24 and moved continuously between plates 20 and under guide rods 30 from the infeed to the discharge end. The conveying means 24 includes an overhead endless chain 31 that is situated above the plates 20 such that its working flight is the lower of the two chain flights. The chain includes a number of equally spaced lugs 32 along the working flight which project downwardly to engage the rearward side of successive crabs to push them along the path defined by plates 20 past the successive stations 25 through 27. Since the crabs are engaged at points 23 by plates 20, there is no need to provide any adjustment for the lugs 32 to adapt them for crabs of different size. Further, the spacing between plates 20 may be such that a relatively large variance of crab sizes may be accommodated by the machine.

The longitudinal flights of the chain 31 are defined by an input end sprocket 33 and a discharge end sprocket 34. These sprockets are appropriately journalled on the framework 18 at elevations above plates 20.

A drive means 35 is operatively connected to the conveyor means to forcibly move the successive crabs along the selected path. Drive means 35 includes a variable speed drive motor 36 that is connected to the input end roll through a chain and sprocket assembly 37. Motor 36 is operated to continuously move the chain 31 during operation of the machine.

A lug 32 engaging the rearward side of a crab at the infeed station will forcibly move the crab engaged thereby to a carapace removing means 38 at the work station 25. It is again noted that the carapace is facing downwardly and that the lug 32 is depending from chain 31 above.

The carapace removing means 38 includes a pair of wedge members 39, one on each of the plates 20. The wedge members 39 include points 40 and surfaces 41 that are inclined downward and downstream with respect to the direction of travel of the successive crabs. The carapace of each crab is engaged by the surfaces 41 and is wedged away from the crab body as it is forced to continue forward movement by the lug 32.

The prying force against the carapace pulls the crab body downwardly against plates 20 but will not disengage the body from the plates since the legs 13 are still intact held down by rods 30, and project outwardly over the plate surfaces to provide support. Once removed, the carapace falls freely with no obstruction into a basket below.

The crab moves from the first work station 25 successively to the second and third work stations 26, 26a at which the exposed gills are removed by the means generally indicated at 44. Gill removing means 44 includes a longitudinally spaced pair of rotatable brushes 45, 45a that engage and forcibly remove the gills from the adjacent edible flesh tissues at respective spaced work stations. The brushes 45, 45a are rotated in a direction opposite to the path of movement of the crabs along the framework.

The brushes 45, 45a are mounted to elongated arms 46 that pivot at bearings 48 on the frame 18. These arms are extensible (telescoping as shown in FIG. 3). Brushes 45, 45a gravitate toward the path of successive crabs by a biasing or cambering means 47 basically comprised of the pivot bearings 48 and adjustable brackets 49 (FIG. 4). The arms 46 are mounted by pivot bearings 48 to the adjustment brackets 49 (FIG. 4).

Brackets 49 are adapted through an adjusting bolt 49a to change the angle of inclination of the rotational axes (which are generally perpendicular to the path of the crabs) of bearings 48 and therefore increase or decrease the force with which the brushes 45, 45a gravitate toward the successive crabs. This is an important feature in that the brushes are gravitationally urged toward the crab bodies and may therefore move in conformity with the crab configuration while in operation. By doing this, the gills are successfully removed and very little, if any, of the adjacent edible tissues are removed by the brushes. Independent motors 50 are provided on the arms 46 for rotating the brushes 45, 45a against the crab bodies.

Also included along the path of the crabs moving along conveyor means 24 is a viscera removing means 51. Means 51 basically comprises a number of longitudinally spaced water-spray jets 52. These jets are located below the path of the crabs between the first and fourth work stations. Water is forced through the jets under relatively high pressure to assist in the evisceration by removing viscera from body cavities. The jets 52 are located below the conveyor means 24 and spray directly upwardly toward the passing crab carcasses. The water jets are very efficient in removing the viscera without damaging or removing valuable crab meat.

A leg severing means 55 is located at the fourth work station 27. It is comprised of a pair of guillotine blades 56 located on opposite sides of the path defined by plates 20. The blades are carried by a bracket 57 which, in turn is affixed to the piston end of a ram cylinder 58. The cylinder body is connected to the general supporting framework 18. Thus, when operating to extend, the ram cylinder will force the guillotine blades 56 downwardly into the path of the forwardly moving crab legs, and retract to move the blades clear of the legs. The blades 56 are spaced apart laterally so that the legs 13 are removed at or directly adjacent the proximal articulations 14. Since the walking legs contain very little meat, it is the primary function of blades 56 to remove the forward legs and pincers at the proximal articulations 14 thereof. Once the legs have been removed, the remaining torso is allowed to drop freely between the plates 20 and into a basket below at the end 24b.

An important feature of this invention is the manner by which the successive crabs are moved continuously through the machine at an optimum speed. This is accomplished by a variable speed control means generally designated at 64.

Variable speed control means 64 is directly associated with the drive means 35 to selectively speed up and slow movement of successive crabs along the prescribed path. Means 64 basically includes a cam 67 operating of an hydraulic flow valve 69 in a conventional manner. The cam is mounted to a sprocket 66 of the chain and sprocket assembly 37, and valve 69 is connected in a hydraulic circuit to motor 36.

Sprocket 66 and the infeed conveyor sprocket 33 are mounted to the same shaft for simultaneous rotation. The cam 67 will operate the flow valve upon each rotation of the sprockets 66 and 33.

The infeed sprocket 33 preferably includes a "pitch circumference" equal to the distance between adjacent lugs 32. Thus, the sprockets 66, 37 will complete one rotation and operate the valve 69 once while a lug 32 moves a distance equal to the lug spacing.

The distances between successive work stations are equal to one another and equal to the lug spacing. With this arrangement, combined with the variable speed control, the movement of crabs through the machine can be preset so they will move slowly through each work station and quickly between stations. These features have enabled the machine, in actual operation, to effectively butcher in excess of 1,000 crabs per hour.

The valve 69 functions to variably restrict flow of hydraulic fluid to the drive motor 36. It is connected in a parallel hydraulic circuit to a pump 75 (FIG. 8) which receives fluid from a reservoir 76. When the valve 69 is utilized to restrict flow of fluid through a parallel branch line, more fluid is allowed to flow to the motor 36 thereby increasing its RPM to a selected level. When the valve is open to allow a less restricted flow of fluid therethrough, correspondingly less fluid will be received by the motor 36. The result is the motor will operate at a lower RPM. In operation, the above described elements cooperate to control movement of crabs past the successive work stations such that the movement is relatively slow through the successive work stations but is comparatively fast between the successive work stations. The extent of the surface of cam 67 is the determining factor of the dwell or duration of the fast and slow cycles.

The motors 50 are also included in series along the hydraulic fluid pressure line. They are connected in parallel with a flow rate valve 80 which operates to compensate for flow requirement of the motors 50. Fluid returns to the reservoir 76 through a return line 81.

Figure 8:
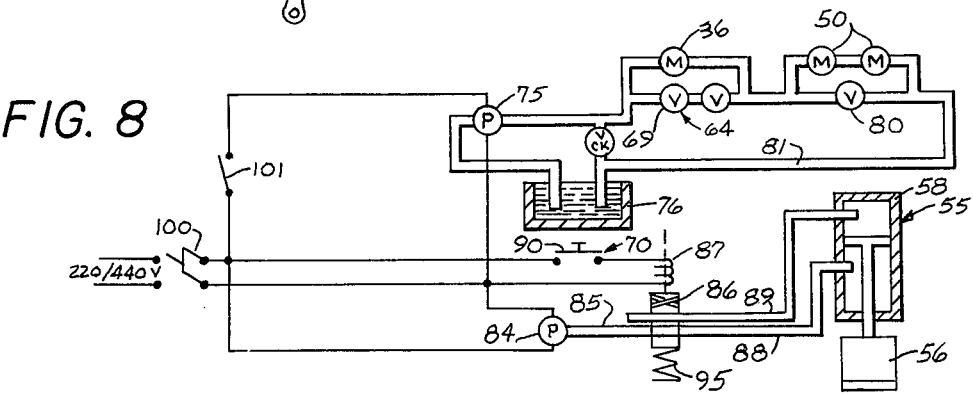
FIG. 8 is a simplified control diagram.

Also illustrated in FIG. 8 is the schematic operational diagram of a guillotine control means 70 utilized with the leg severing means 55. Means 70 includes a pneumatic pump 84 or external source that supplies air under pressure through a line 85 to a valve 86. Valve 86 is connected to the double-acting cylinder 58 by respective lines 88 and 89. Valve 86 is operated by an electrical solenoid 87 which is connected to a power source through a momentary contact switch 90. This switch 90 is located on the framework 18 adjacent the sprocket 66. An operator 92 is positioned on sprocket 66 to actuate the switch 90 upon each rotation of the sprocket. When closed, the switch completes a circuit to the solenoid 87 which is mechanically connected to the valve 86. The valve 86 moves to an extended position wherein pressurized air is delivered to the chamber above the piston of cylinder 58, forcing the guillotine blades downwardly to sever the legs of a crab located directly below.

As the momentary contact 90 opens, the circuit is broken and a spring 95 returns the valve to its normal position wherein air pressure is delivered to the base of the cylinder 58 to move and hold the guillotine blades in an up position.

To initiate operation, the machine is connected to a source of electrical energy and a central starter switch 100 is moved to a closed position. Circuits are thus completed to the pneumatic pump 84 and hydraulic pump 75. As the pump 75 begins to function, so do the motors 36 and 50. They continue to function without interruption until the circuit to the pumps is broken, either through the starter switch 100 or through any of a number of safety limit switches (one of which is indicated 101 in FIG. 8). Thus it may be understood that while the machine is operating, the conveying means 24 operates continuously as do the brushes 45.

To butcher a crab then, an operator places the crab with the carapace facing downwardly against the plate 28 and pushes the plate downwardly until the crab may be pushed forwardly between plates 20 to become engaged at the points 23 between carapace 12 and proximal leg articulations 14. The crab is pushed forwardly under rods 30 by the operator until the rearward end thereof is appropriately located for engagement by one of the successive lugs 32. The conveying means 24 operates to forcibly slide the crab along the plates 20 past the successive work stations 25 through 27.

As the crab arrives at the first work station 25, the cam 67 operates the valve 69 to slow forward progress of the crab during operation of the carapace removing means 38. The slowed movement of the crab is maintained until the carapace has been successfully removed and dropped into a bin below. At this point, the chain speed is increased and the de-backed crab is moved rapidly toward the second work station 26. Upon arrival at second work station 26, the conveyor speed is slowed to move the crab slowly past the first brush 45 to facilitate removal of the exposed gills. Conveyor speed is then increased as the crab moves to the second brush 45a at the third work station 26a.

The slowed motion is again initiated as the crab moves past the second brush 45a. As soon as the crab leaves contact with the second brush 45a, the conveyor speed is increased to quickly move the crab to the fourth work station 27. As the crab moves past the second to the fourth work station, the viscera removing means 51 operates to further clean viscera from areas of the body cavity.

Finally, at the fourth work station, the conveyor speed is again slowed substantially and the crab is moved slowly into the downward path of the guillotine blades 56. As soon as the lug 32 is located directly below the blades 56, the corresponding actuator 92 operates the momentary contact switch 90 to close the circuit to solenoid 87. In turn, the solenoid operates valve 86 to cause extension of cylinder 58 and thereby move the guillotine blades 56 downwardly to sever the legs 13 at the proximal articulations 14. Once the legs have been removed, the body moves forward and then drops gravitationally downwardly to a receiving basket below.

The applicants have found that the machine can be operated to successfully obtain a production rate of 1,000 crabs/hr. by arranging the control means 64 to move the crabs through the work stations at a speed of 7.3 feet/min. and between the work stations at an increased speed of 26.8 feet/min.

It may have become obvious from the above description and attached drawings that various changes and modifications may be made therein that are presently comprehended but have not been specifically dealt with in this specification. It is therefore intended that only the following claims be taken as definitions of our invention.

What we claim is:

1. A crab butchering machine, comprising:
   an elongated crab support means for slidably supporting a crab carcass at points thereon between its carapace and the proximal articulation of its legs with the carapace facing downwardly;
   an overhead endless chain conveyor having lugs thereon for engaging and sliding successive crabs along the elongated crab support means in a prescribed path from an infeed station to a discharge station;
   carapace removing means along the prescribed path for performing the carapace removal operation as the crab is slid along the path exposing the crab body including the viscera and the gills;
   viscera removing means along the path and beneath the crab support means for performing the viscera removal operation as the crab is moved along the prescribed path;
   a pair of rotatable gill removing brushes beneath the crab support means on opposite sides of the path and powered to rotate about axes for performing the gill removal operation;
   biasing means for yieldably urging the brushes inward against the crab body with the brushes following the contours of the crab body to efficiently remove the gills without damaging the body;
   leg severing means along the path for performing the leg severing operation; and
   control means for varying the speed of the conveying means to increase the rate of movement of the crabs between the removal and severing operations and to decrease the rate of movement of the crabs during the removal and severing operations.

2. The crab butchering machine as defined in claim 1 wherein one of the pair of brushes is positioned downstream of the other brush so that only one brush is engaging a crab body at one time.

3. The machine as defined by claim 1 wherein the spaces between successive lugs are equal and the spaces between the carapace removing means, the viscera removing means, the pair of gill removing brushes and the leg severing means are equal to the lug spacing.

4. The machine as defined by claim 1 wherein the biasing means is comprised of a freely pivoted pair of swing arms mounting the brushes at outer ends thereof and wherein the pivot axes of the swing arms are inclined toward the prescribed path such that the brushes at the outer swing arm ends will gravitate toward the path.

5. The machine as defined by claim 1 wherein the carapace removing means is comprised of a stationary wedge member located in the path of a crab moving on the conveying means, wherein the wedge member includes a sharp point at the elevation of said point of contact and a downwardly inclined wedge surface leading downstream toward the viscera removing means.

6. The machine as defined by claim 1 wherein the leg severing means is comprised of:
   a pair of guillotine blades; and
   ram means mounting the guillotine blades for vertical movement between raised positions elevationally clear of a crab moving along the prescribed path and lowered positions intersecting the proximal articulations of the crab's legs; and
   guillotine control means for actuating the ram means to lower in response to positioning of a crab below the blades by the conveying means.

* * * * *